Feb. 17, 1925.
J. W. WATSON
1,527,022
FRICTION MEMBER
Filed Nov. 12, 1920
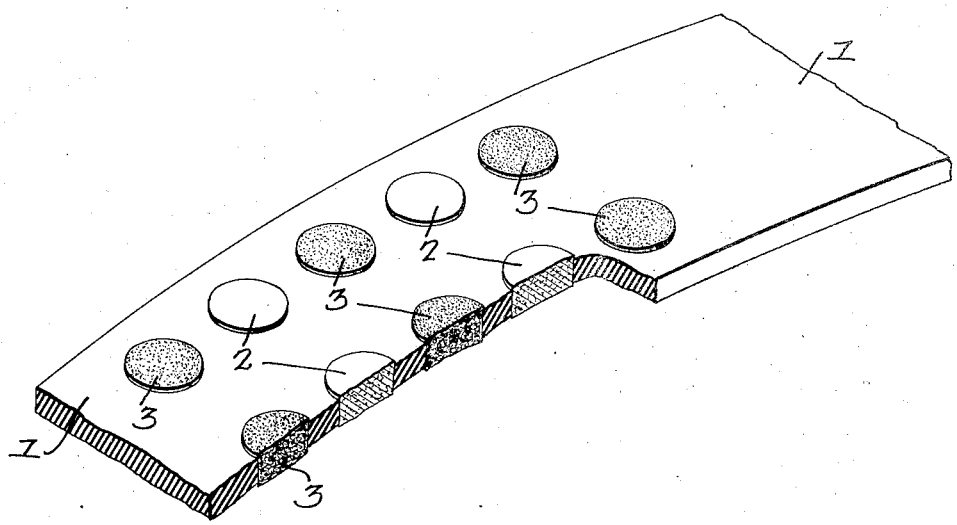
Inventor—
John Warren Watson.
by his Attorneys
Howson & Howson Patented Feb. 17, 1925.

1,527,022

UNITED STATES PATENT OFFICE.

JOHN WARREN WATSON, OF PHILADELPHIA, PENNSYLVANIA.

FRICTION MEMBER.

Application filed November 12, 1920. Serial No. 423,726.

*To all whom it may concern:*

Be it known that I, JOHN WARREN WATSON, a citizen of the United States, residing in Philadelphia, Pennsylvania, have invented a Friction Member, of which the following is a specification.

It has been noted that in devices such as friction clutches, friction brakes, snubbers, shock absorbers and the like, in which the frictional engagement of two members tends to prevent or retard their relative movement, a vibratory condition is set up which is particularly noticeable at the beginning of or doing slow relative movement of said members, with the result that there is produced a noise and a chattering or alternate engagement and disengagement, which may be highly objectionable.

One object of my invention therefore is to provide means for preventing the noise and vibratory or chattering action noted, and more specifically to provide a friction member which shall cooperate with its associated member or structure in such manner that there is neither noise nor chattering produced when said parts are relatively moved, even after they have remained immovably in engagement for some time.

A further object of the invention is to provide a friction member with means for applying to its working surface as well as to the surface of its cooperating friction member, a thin film of lubricant, which while sufficient to prevent such vibratory conditions as would produce noise or alternate engagement and disengagement, shall not materially interfere with the proper functioning of said member as a friction holding or producing element in the combination in which it is employed.

It is further desired to provide a novel form of friction member, which in addition to including means for supplying a thin film of lubricant to the surface which it engages as well as to its own surface, shall also include means for absorbing and retaining any surplus lubricant which may be supplied, so that excess of the latter shall be avoided and a reservoir be provided from which the lubricant may be later delivered as required.

These objects and other advantageous ends I attain as hereinafter set forth, reference being had to the accompanying drawing, in which, Fig. 1 is a perspective view, partly in section, illustrating a friction member equipped with one form of my invention.

In the above drawing, 1 represents a portion of a band, shoe, drum, or other structure forming one of a pair of coacting friction elements, of such material or composition that it tends to frictionally grip or retard the relative movement of the second element with which it cooperates.

Carried by this friction member are a series of bodies 2 of leather or equivalent material soaked in or impregnated with a lubricant such as neat's-foot oil, castor oil, or the like, and these bodies in the present instance are shown as cylindrical pieces set in correspondingly formed holes in the member 1 with either or both of their flat ends projecting slightly beyond the face or faces of said member.

Adjacent these lubricant-carrying members 2 I mount one or any desired number of wipers 3 in the form of bodies of felt or equivalent material designed to absorb and hold surplus or waste lubricant escaping from or provided by the bodies 2.

It is to be understood that under operating conditions only sufficient lubricant is supplied by or delivered from the leather bodies 2 as will form an exceedingly thin film upon the surface of their supporting friction element as well as over the surface of its coacting element, and while this film acts to prevent or materially reduce static friction between the two members, it does not appreciably affect their desired frictional cooperation for the purpose of retarding or preventing their relative movement. In other words, while a predetermined force is required to move said elements relatively to each other, they begin movement from a state of rest under the action of said force without producing noise and without chattering and also are capable of continuing in slow relative movement under the same conditions.

The felt bodies act to absorb any slight surplus of lubricant which may be delivered from the leather bodies 2 and thus later serve as auxiliary sources of supply from which may also be delivered the lubricant necessary to obtain the objects above noted.

I claim:

1. The combination of a friction member and at least one lubricant-impregnated body carried thereby for supplying a film of lubricant to the friction face of said member.

2. The combination of a friction member; a body of absorbent material mounted therein; and a lubricant carried by said body.

3. The combination of a friction member; a body of absorbent material mounted therein; lubricating material carried by said body; with an absorbent wiper also carried by the friction member.

4. The combination of a friction member having at least one body of lubricant-impregnated leather mounted therein.

5. The combination of a friction member having a series of lubricant impregnated bodies of leather mounted therein; with felt wipers also mounted in said member.

6. The combination of a band of friction material; with at least one lubricant-impregnated body carried by said band and projecting slightly beyond the flat surface thereof.

7. The combination of a band of friction material; at least one lubricant impregnated body carried thereby, its surface projecting slightly beyond the flat surface of said band; and at least one absorptive wiper also carried by said band adjacent said body.

8. A lubricant impregnated friction insert.

9. A friction member comprising a lubricant impregnated friction insert.

10. A friction member comprising a lubricant impregnated insert.

11. A friction member comprising lubricant impregnated means for governing the friction qualities of said member.

12. A friction member comprising a lubricant impregnated insert for governing the friction qualities of said member.

JOHN WARREN WATSON.